US012804665B2

(12) United States Patent
Bhamri et al.

(10) Patent No.: US 12,804,665 B2
(45) Date of Patent: Nov. 17, 2026

(54) CONFIGURING PHYSICAL DOWNLINK CONTROL CHANNEL OCCASIONS FOR MONITORING

(71) Applicant: Lenovo (Singapore) Pte. Ltd., New Tech Park (SG)

(72) Inventors: Ankit Bhamri, Rödermark (DE); Alexander Johann Maria Golitschek Edler von Elbwart, Darmstadt (DE); Karthikeyan Ganesan, Kronberg im Taunus (DE); Ali Ramadan Ali, Kraiburg am Inn (DE); Sher Ali Cheema, Ilmenau (DE)

(73) Assignee: Lenovo (Singapore) Pte. Ltd., Singapore (SG)

(*) Notice: Subject to any disclaimer, the term of this patent is extended or adjusted under 35 U.S.C. 154(b) by 440 days.

(21) Appl. No.: 18/553,684

(22) PCT Filed: Mar. 31, 2022

(86) PCT No.: PCT/IB2022/052990

§ 371 (c)(1),
(2) Date: Oct. 2, 2023

(87) PCT Pub. No.: WO2022/208415

PCT Pub. Date: Oct. 6, 2022

(65) Prior Publication Data

US 2024/0205928 A1 Jun. 20, 2024

Related U.S. Application Data

(60) Provisional application No. 63/169,629, filed on Apr. 1, 2021.

(51) Int. Cl.
*H04W 72/23* (2023.01)
*H04W 72/0446* (2023.01)

(52) U.S. Cl.
CPC ....... *H04W 72/23* (2023.01); *H04W 72/0446* (2013.01)

(58) Field of Classification Search
CPC .......................... H04W 72/23; H04W 72/0446
See application file for complete search history.

(56) References Cited

U.S. PATENT DOCUMENTS

| | | | |
|---|---|---|---|
| 11,638,246 B2 | 4/2023 | Hamidi-Sepehr et al. | |
| 2021/0050933 A1 | 2/2021 | Myung et al. | |
| 2022/0132341 A1* | 4/2022 | Lee | H04L 5/0053 |

FOREIGN PATENT DOCUMENTS

| | | |
|---|---|---|
| CN | 112514309 A | 3/2021 |
| CN | 112567672 A | 3/2021 |

(Continued)

OTHER PUBLICATIONS

PCT/IB2022/052990, "International Search Report and the Written Opinion of the International Searching Authority, or the Declaration", International Searching Authority, Jun. 14, 2022, pp. 1-14.

(Continued)

*Primary Examiner* — Melvin C Marcelo
(74) *Attorney, Agent, or Firm* — Kunzler Needham & Hilton; Bruce R. Needham

(57) ABSTRACT

Apparatuses, methods, and systems are disclosed for configuring physical downlink control channel occasions for monitoring. One method includes receiving, at a remote device, a configuration from a network device. The configuration includes information to determine slots within a set of slots in which to monitor physical downlink control channel (PDCCH) occasions. The method includes, in response to receiving the configuration: monitoring the PDCCH occasions; and receiving a PDCCH on at least one occasion of the monitored PDCCH occasions.

19 Claims, 9 Drawing Sheets

(56) References Cited

FOREIGN PATENT DOCUMENTS

| | | | |
|---|---|---|---|
| EP | 3834351 | B1 | 10/2023 |
| WO | 2020024202 | A1 | 2/2020 |
| WO | 2020033652 | A1 | 2/2020 |
| WO | 2020069135 | A2 | 4/2020 |

OTHER PUBLICATIONS

Vivo, "Discussion on PDCCH monitoring skipping and PDCCH monitoring periodicity switch", 3GPP TSG RAN WG1 #97 R1-1906172, May 13-17, 2019, pp. 1-4.

3GPP, "3rd Generation Partnership Project; Technical Specification Group Radio Access Network; NR; Physical channels and modulation (Release 16)", 3GPP TS 38.211 V16.4.0, Dec. 2020, pp. 1-133.

3GPP, "3rd Generation Partnership Project; Technical Specification Group Radio Access Network; NR; Physical layer procedures for control (Release 16)", 3GPP TS 38.213 V16.4.0, Dec. 2020, pp. 1-181.

3GPP, "3rd Generation Partnership Project; Technical Specification Group Radio Access Network; NR; Physical layer procedures for data (Release 16)", 3GPP TS 38.214 V16.4.0, Dec. 2020, pp. 1-169.

* cited by examiner

400

```
-- ASN1START
-- TAG-SEARCHSPACE-START

SearchSpace ::=                            SEQUENCE {
    searchSpaceId                              SearchSpaceId,
    controlResourceSetId                       ControlResourceSetId          OPTIONAL,   -- Cond SetupOnly
    monitoringSlotPeriodicityAndOffset         CHOICE {
        sl1                                        NULL,
        sl2                                        INTEGER (0..1),
        sl4                                        INTEGER (0..3),
        sl5                                        INTEGER (0..4),
        sl8                                        INTEGER (0..7),
        sl10                                       INTEGER (0..9),
        sl16                                       INTEGER (0..15),
        sl20                                       INTEGER (0..19),
        sl40                                       INTEGER (0..39),
        sl80                                       INTEGER (0..79),
        sl160                                      INTEGER (0..159),
        sl320                                      INTEGER (0..319),
        sl640                                      INTEGER (0..639),
        sl1280                                     INTEGER (0..1279),
        sl2560                                     INTEGER (0..2559)
    }                                                                        OPTIONAL,   -- Cond Setup
    duration                                   INTEGER (2..2559)             OPTIONAL,   -- Need R
    monitoringSymbolsWithinSlot                BIT STRING (SIZE (14))        OPTIONAL,   -- Cond Setup
    monitoringSlotsWithinGroup                 BIT STRING ((SIZE (1.. 8)) OF INTEGER (0..1)
OPTIONAL,
```

FIG. 4

CONFIGURING PHYSICAL DOWNLINK CONTROL CHANNEL OCCASIONS FOR MONITORING

CROSS-REFERENCE TO RELATED APPLICATIONS

This application claims priority to U.S. Patent Application Ser. No. 63/169,629 entitled "APPARATUSES, METHODS, AND SYSTEMS FOR MULTI-SLOT PDCCH MONITORING" and filed on Apr. 1, 2021 for Ankit Bhamri et al., which is incorporated herein by reference in its entirety.

FIELD

The subject matter disclosed herein relates generally to wireless communications and more particularly relates to configuring physical downlink control channel occasions for monitoring.

BACKGROUND

In certain wireless communications networks, physical downlink control channel ("PDCCH") monitoring may be performed. Such networks may involve multi-slot PDCCH monitoring.

BRIEF SUMMARY

Methods for configuring physical downlink control channel occasions for monitoring are disclosed. Apparatuses and systems also perform the functions of the methods. One embodiment of a method includes receiving, at a remote device, a configuration from a network device. The configuration includes information to determine slots within a set of slots in which to monitor physical downlink control channel (PDCCH) occasions. In some embodiments, the method includes, in response to receiving the configuration: monitoring the PDCCH occasions; and receiving a PDCCH on at least one occasion of the monitored PDCCH occasions.

One apparatus for configuring physical downlink control channel occasions for monitoring includes a remote device. In some embodiments, the apparatus includes a processor. In various embodiments, the apparatus includes a receiver that receives, at a remote device, a configuration from a network device. The configuration includes information to determine slots within a set of slots in which to monitor physical downlink control channel (PDCCH) occasions. In response to receiving the configuration: the processor monitors the PDCCH occasions; and the receiver receives a PDCCH on at least one occasion of the monitored PDCCH occasions.

Another embodiment of a method for configuring physical downlink control channel occasions for monitoring includes transmitting, from a network device, a configuration to a remote device. The configuration includes information to determine slots within a set of slots in which the remote device is to monitor physical downlink control channel (PDCCH) occasions. In some embodiments, the method includes transmitting a PDCCH on at least one occasion of the PDCCH occasions.

Another apparatus for configuring physical downlink control channel occasions for monitoring includes a network device. In some embodiments, the apparatus includes a transmitter that: transmits a configuration to a remote device, wherein the configuration includes information to determine slots within a set of slots in which the remote device is to monitor physical downlink control channel (PDCCH) occasions; and transmits a PDCCH on at least one occasion of the PDCCH occasions.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 4 is a block diagram illustrating one embodiment of a SearchSpace IE;

DETAILED DESCRIPTION

Figure 1:
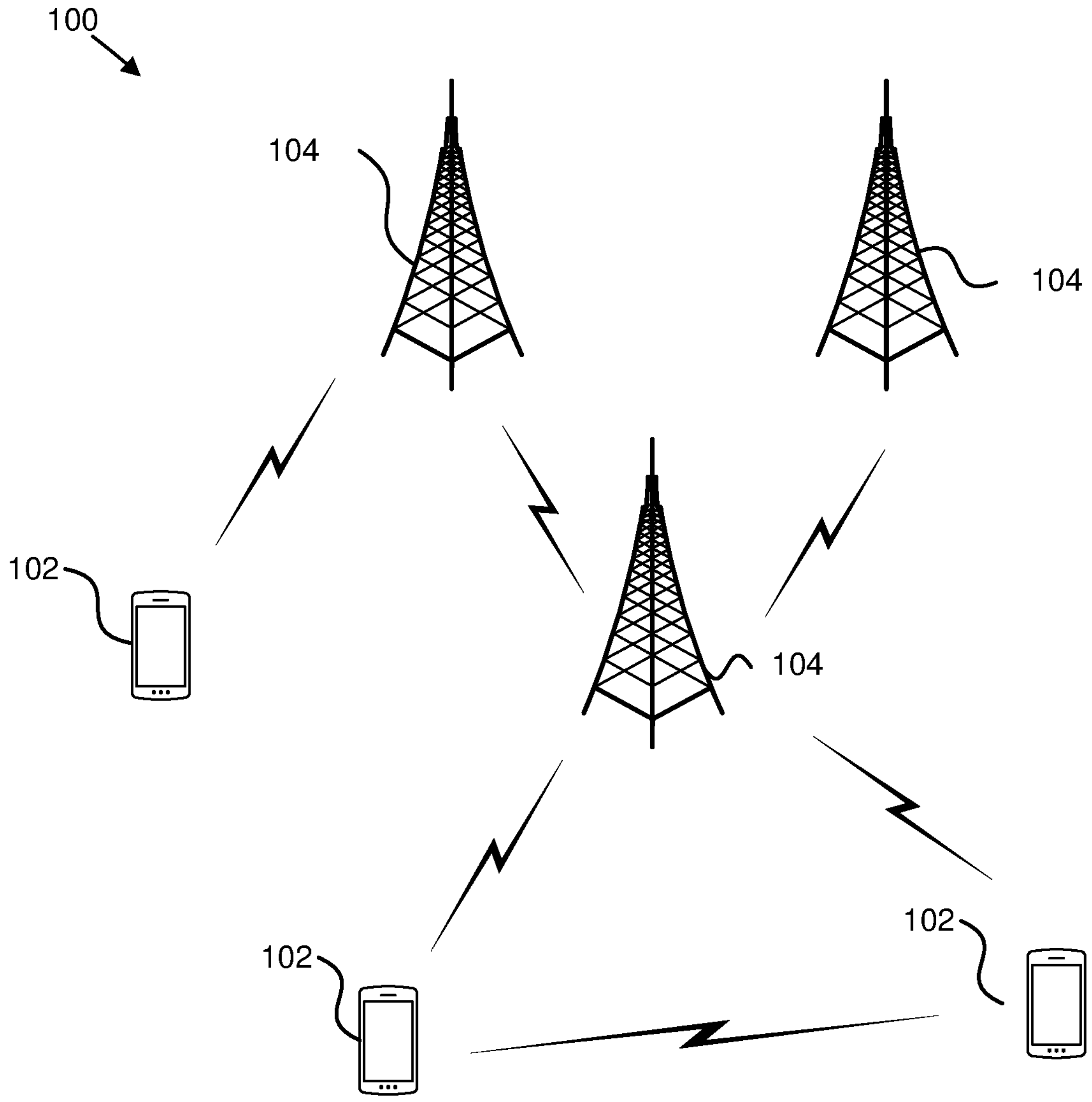
FIG. 1 is a schematic block diagram illustrating one embodiment of a wireless communication system for configuring physical downlink control channel occasions for monitoring.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments oflike elements.

FIG. 1 depicts an embodiment of a wireless communication system 100 for configuring physical downlink control channel occasions for monitoring. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle onboard computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to and/or may include one or more of an access point, an access terminal, a base, a base station, a location server, a core network ("CN"), a radio network entity, a Node-B, an evolved node-B ("eNB"), a 5G node-B ("gNB"), a Home Node-B, a relay node, a device, a core network, an aerial server, a radio access node, an access point ("AP"), new radio ("NR"), a network entity, an access and mobility management function ("AMF"), a unified data management ("UDM"), a unified data repository ("UDR"), a UDM/UDR, a policy control function ("PCF"), a radio access network ("RAN"), a network slice selection function ("NSSF"), an operations, administration, and management ("OAM"), a session management function ("SMF"), a user plane function ("UPF"), an application function, an authentication server function ("AUSF"), security anchor functionality ("SEAF"), trusted non-3GPP gateway function ("TNGF"), or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in third generation partnership project ("3GPP"), wherein the network unit 104 transmits using an OFDM modulation scheme on the downlink ("DL") and the remote units 102 transmit on the uplink ("UL") using a single-carrier frequency division multiple access ("SC-FDMA") scheme or an orthogonal frequency division multiplexing ("OFDM") scheme. More generally, however, the wireless communication system 100 may implement some other open or proprietary communication protocol, for example, WiMAX, institute of electrical and electronics engineers ("IEEE") 802.11 variants, global system for mobile communications ("GSM"), general packet radio service ("GPRS"), universal mobile telecommunications system ("UMTS"), long term evolution ("LTE") variants, code division multiple access 2000 ("CDMA2000"), Bluetooth®, ZigBee, Sigfox, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a remote unit 102 may receive, at a remote device, a configuration from a network device. The configuration includes information to determine slots within a set of slots in which to monitor physical downlink control channel (PDCCH) occasions. In some embodiments, the remote unit 102 may, in response to receiving the configuration: monitor the PDCCH occasions; and receive a PDCCH on at least one occasion of the monitored PDCCH occasions. Accordingly, the remote unit 102 may be used for configuring physical downlink control channel occasions for monitoring.

In certain embodiments, a network unit 104 may transmit, from a network device, a configuration to a remote device. The configuration includes information to determine slots within a set of slots in which the remote device is to monitor physical downlink control channel (PDCCH) occasions. In some embodiments, the network unit 104 may transmit a PDCCH on at least one occasion of the PDCCH occasions. Accordingly, the network unit 104 may be used for configuring physical downlink control channel occasions for monitoring.

Figure 2:
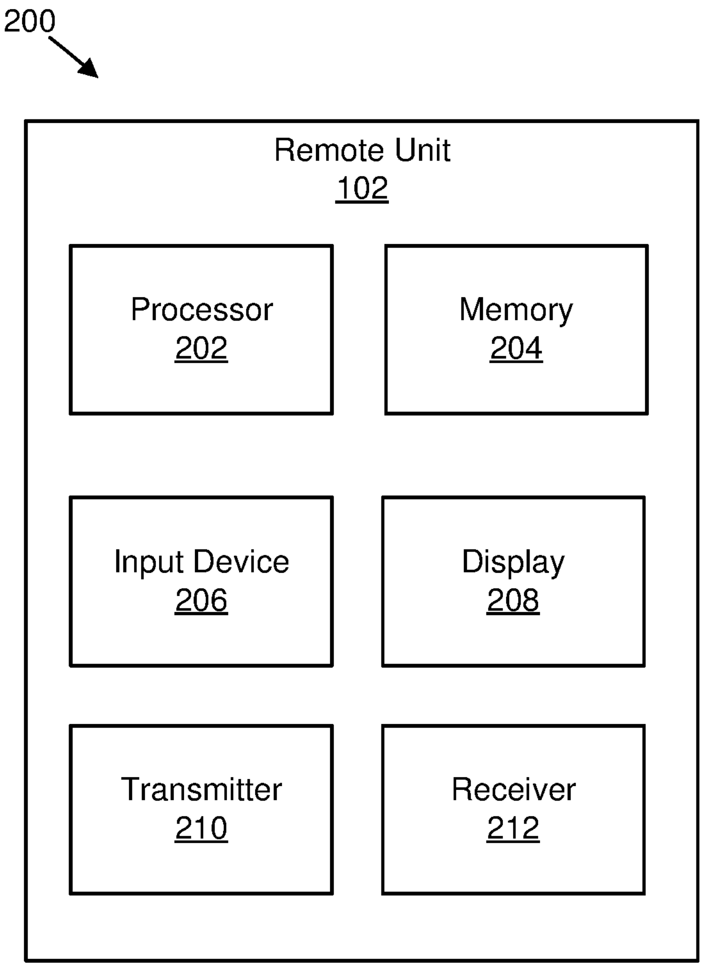
FIG. 2 is a schematic block diagram illustrating one embodiment of an apparatus that may be used for configuring physical downlink control channel occasions for monitoring.

FIG. 2 depicts one embodiment of an apparatus 200 that may be used for configuring physical downlink control channel occasions for monitoring. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, a liquid crystal display ("LCD"), a light emitting diode ("LED") display, an organic light emitting diode ("OLED") display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

In certain embodiments, the receiver 212 receives, at a remote device, a configuration from a network device. The configuration includes information to determine slots within a set of slots in which to monitor physical downlink control channel (PDCCH) occasions. In response to receiving the configuration: the processor 202 monitors the PDCCH occasions; and the receiver 212 receives a PDCCH on at least one occasion of the monitored PDCCH occasions.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
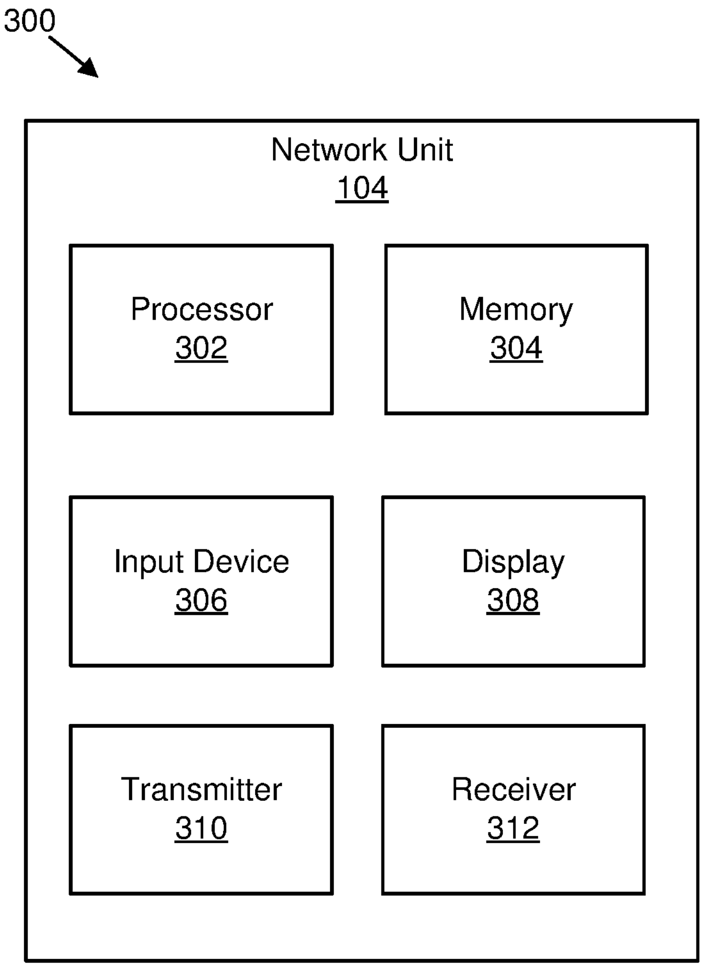
FIG. 3 is a schematic block diagram illustrating one embodiment of an apparatus that may be used for configuring physical downlink control channel occasions for monitoring.

FIG. 3 depicts one embodiment of an apparatus 300 that may be used for configuring physical downlink control channel occasions for monitoring. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In certain embodiments, the transmitter 310: transmits a configuration to a remote device, wherein the configuration includes information to determine slots within a set of slots in which the remote device is to monitor physical downlink control channel (PDCCH) occasions; and transmits a PDCCH on at least one occasion of the PDCCH occasions.

It should be noted that one or more embodiments described herein may be combined into a single embodiment.

In certain embodiments, new radio ("NR") operation may be extended beyond 52.6 to 71 GHz such as with the following related to physical downlink control channel ("PDCCH") monitoring: 1) enhancements for multi-physical downlink shared channel ("PDSCH") and/or physical uplink shared channel ("PUSCH") scheduling and hybrid automatic repeat request ("HARQ") support with a single downlink control information ("DCI"); and/or 2) enhancement to PDCCH monitoring including blind detection and/or control channel element ("CCE") budget, and multi-slot span monitoring (e.g., potential limitation to UE PDCCH configuration and capability related to PDCCH monitoring).

In some embodiments, higher subcarrier spacing ("SCS") values of 480 kHz and 960 kHz may be used. For these high SCS values, it may be understood that multi-slot PDCCH monitoring makes more sense since the absolute time duration for a single slot will be very small and, therefore, PDCCH monitoring in every slot will not be feasible with existing UE capabilities. For facilitating multi-slot PDCCH monitoring, search space enhancements may be used. In various embodiments, only slot and/or span-based monitoring is possible with a search space configuration. In certain embodiments, there may be solutions to better facilitate multi-slot PDCCH monitoring with search space configuration enhancements.

In various embodiments, solutions may enhance a search space configuration for facilitating multi-slot PDCCH monitoring. Specifically, the search space configuration may be enhanced to allow a user equipment ("UE") to determine monitoring occasions within a multi-slot duration by indicating: 1) a periodicity in multiples of multi-slot duration (e.g., slot groups); 2) duration in multiples of slot groups; 3) indication of one or more slots within a slot group for monitoring; and/or 4) indication of specific symbols within the indicated slots for monitoring.

In certain embodiments, different implementations with different mechanisms for multi-slot monitoring may be used for NR operation beyond 52.6 GHz to 71 GHz with high SCS 480 kHz and 960 kHz.

In some embodiments, a UE is configured with multi-slot (e.g., slot group) PDCCH monitoring and a periodicity in a search space configuration is configured only in a multiple of the slot group size or duration. The minimum periodicity may not be less than a multi-slot duration (e.g., 4 slots for 480 kHz SCS value and higher values of periodicity may be in multiples of 4 slots).

In various embodiments, a UE is configured with multi-slot (e.g., slot group) PDCCH monitoring and a duration in a search space configuration is configured only in multiples of the slot group sizes or durations, but less than or equal to a periodicity configured in the search space configuration. It should be noted that, although a motivation for multi-slot PDCCH monitoring with high SCS is beyond 52.6 GHz, solutions may be equally applicable for any SCS and frequency range ("FR").

In a first embodiment, there may be a slot indication for determining multiple slots with monitoring occasions within a multi-slot group. According to the first embodiment, a UE is configured with multi-slot PDCCH monitoring and a search space configuration is enhanced to include an indication for determining slots within the multi-slot group where monitoring occasions are located (e.g., monitoringSlotsWithinGroup). The indication of slots with monitoring occasion may be received by a new bitmap in the search space configuration with each bit in the bitmap representing one or more slots, where '0' in the bitmap implies there is no PDCCH monitoring occasion in a slot and '1' in the bitmap implies PDCCH monitoring occasion in the slot. The number of bits in the bitmap may be variable depending upon a number of slots for multi-slot PDCCH monitoring. An example illustration for a search space information element ("IE") is shown in FIG. 4. Specifically, FIG. 4 is a block diagram illustrating one embodiment of a SearchSpace IE 400.

In one implementation, a size of a monitoringSlotsWithinGroup may be fixed depending upon a subcarrier spacing that is configured at the UE. For example, with 480 kHz SCS, the bitmap size is 4 bits for 4 slots, while for 960 kHz SCS, the bitmap size is 8 bits for 8 slots. In another implementation, one bit represents multiple slots, such that, for example, with 480 kHz SCS the bitmap size is 2 bits for 4 slots, while for 960 kHz SCS the bitmap size is 4 bits for 8 slots. In this example, the first bit indicates a PDCCH monitoring occasion in the first two slots of a slot group, the second bit indicates a PDCCH monitoring occasion in the second two slots of a slot group, and so forth. In yet another implementation, one bit represents one slot, and the bitmap size is a fraction of the number of slots in a slot group, where the bitmap is repeated to determine the slots with monitoring occasions for the whole slot group. For example, with 960 kHz SCS, the bitmap size is 4 bits for 4 slots with a slot group size of 8 slots. The bitmap of 4 bits is then applied to the first group of 4 slots (e.g., slots 0-3) as well as to the second group of 4 bits (e.g., slots 4-7).

Figure 5:
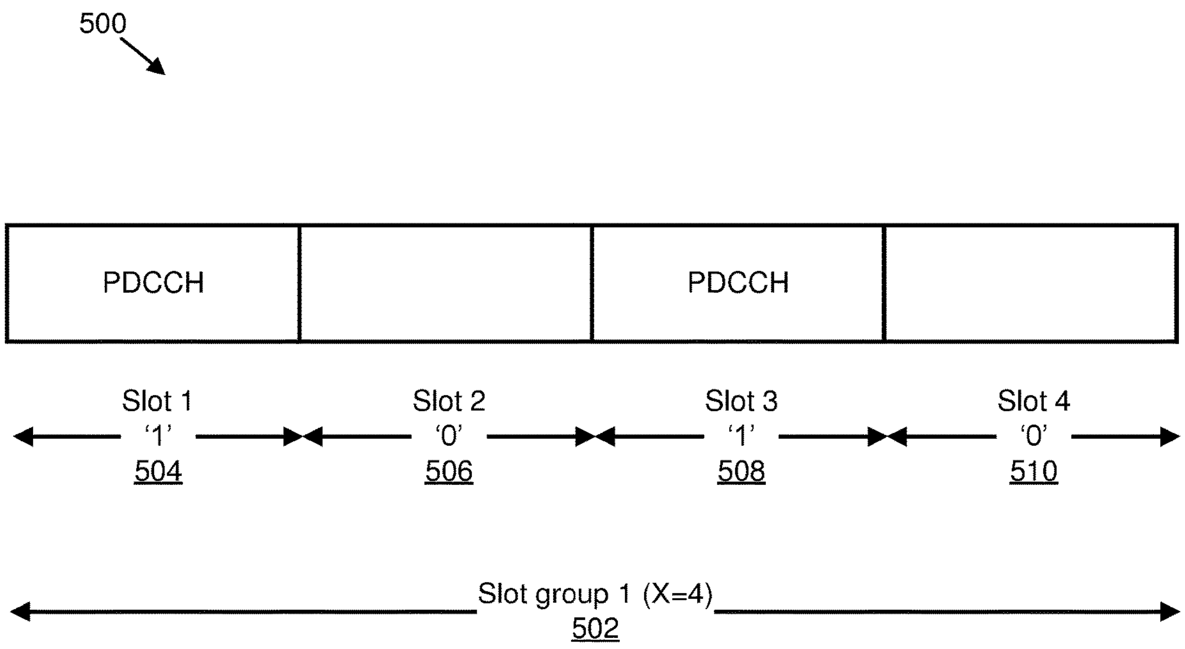
FIG. 5 is a timing diagram illustrating one embodiment of a system in which there is a monitoring slot indication for multi-slot PDCCH monitoring.

An example illustration for a 4-slot duration with a 4-bit bitmap for monitoringSlotsWithinGroup indicating "1010" is shown in FIG. 5 where the first and third slot within the group have monitoring occasions. Specifically, FIG. 5 is a timing diagram illustrating one embodiment of a system 500 in which there is a monitoring slot indication for multi-slot PDCCH monitoring. The system 500 includes a slot group 1 502 (with a number of slots X=4). The slot group 1 502 includes a slot 1 504 (having a value "1"), a slot 2 506 (having a value "0"), a slot 3 508 (having a value "1"), and a slot 4 510 (having a value "0"). The slots having the value "1" have PDCCH monitoring occasions.

In one implementation, when a UE is configured with monitoringSlotsWithinGroup, then it is not required that the UE be configured with monitoringSymbolsWithinSlot. In this implementation, the UE is expected to monitor the entire slot for which the monitoring occasion is indicated, e.g., in all symbols of the corresponding slot.

In another implementation, a UE is configured both with monitoringSlotsWithinGroup and monitoringSymbolsWithinSlot. In this implementation, the monitoring slots within the multi-slot is indicated by setting corresponding bit value to '1' in monitoringSlotsWithinGroup and exact symbols within the indicated slot for monitoring occasion are indicated by setting corresponding bit value to '1' in monitoringSymbolsWithinSlot. In this implementation, a same symbol level bitmap, e.g., as given by monitoringSymbolsWithinSlot, is applied to all the slots where monitoring occasions are indicated.

Figure 6:
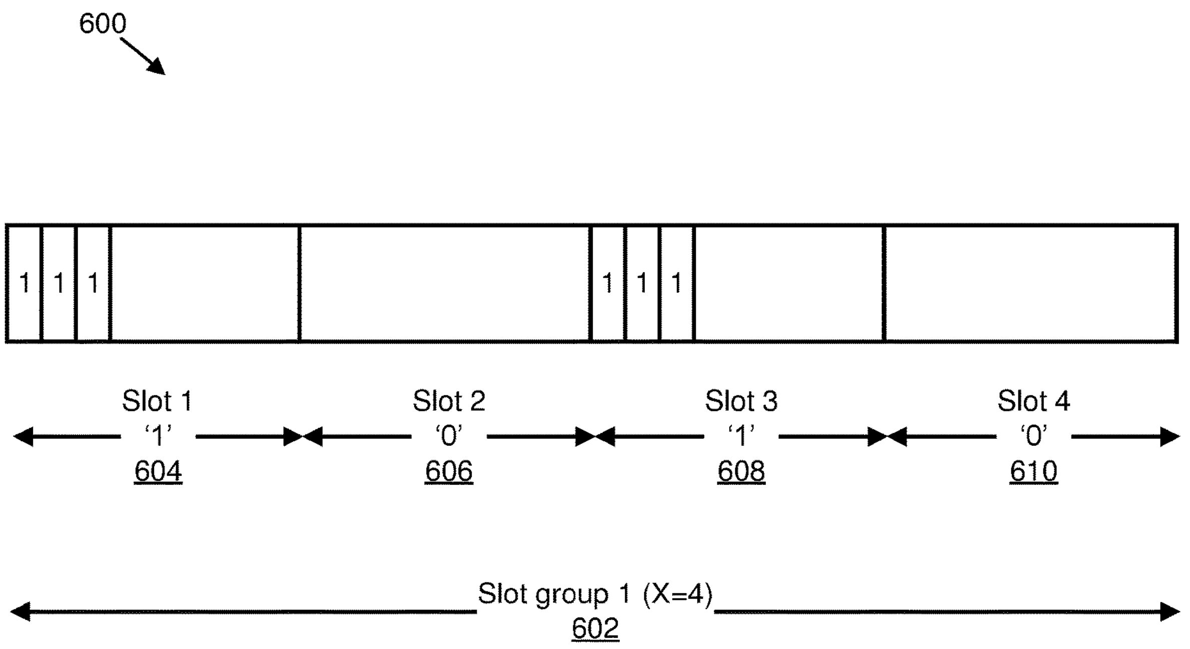
FIG. 6 is a timing diagram illustrating one embodiment of a system in which there is a monitoring slot indication and monitoring symbol indication for multi-slot PDCCH monitoring.

An example illustration for a 4-slot duration with a 4-bit bitmap for monitoringSlotsWithinGroup indicating "1010" and monitoringSymbolsWithinSlot indicating "11100000000000" is shown in FIG. 6, where the first and third slot within the group have monitoring occasions on first, second, and third symbols. Specifically, FIG. 6 is a timing diagram illustrating one embodiment of a system 600 in which there is a monitoring slot indication and monitoring symbol indication for multi-slot PDCCH monitoring. The system 600 includes a slot group 1 602 (with a number of slots X=4). The slot group 1 602 includes a slot 1 604 (having a value "1"), a slot 2 606 (having a value "0"), a slot 3 608 (having a value "1"), and a slot 4 610 (having a value "0"). The slots having the value "1" have PDCCH monitoring occasions indicated by a second bitmap (e.g., monitoringSymbolsWithinSlot) as show with the "1"s with each slot. The unmarked symbols with the slots have values of "0".

In one implementation, a UE is configured both with monitoringSlotsWithinGroup and monitoringDurationWithinSlot. In this implementation, the monitoring slots within the multi-slot is indicated by setting the corresponding bit value to '1' in monitoringSlotsWithinGroup. In each of those monitoring slots, the monitoring starts at the first symbol of the slot and lasts for a number of symbols indicated by monitoringDurationWithinSlot. In this implementation, the same monitoring duration is applied to all the slots where monitoring occasions are indicated. In certain implementations, a plurality of monitoring durations can be indicated, being applied respectively for the slots indicated as monitoring PDCCH in monitoringSlotsWithinGroup. In some implementations, one or more offsets in symbols for the PDCCH monitoring can be indicated by monitoringStartSymbol to start the monitoring at the indicated symbol number instead of at the beginning of a slot.

An example illustration for a 4-slot duration with a 4-bit bitmap for monitoringSlotsWithinGroup indicating "1010", monitoringStartSymbol indicating "0" and monitoringDurationWithinSlot indicating "3=011" is shown in FIG. 6, where the first and third slot within the group have monitoring occasions on first, second, and third symbols.

In a second embodiment, there may be a slot indication for determining a single slot with monitoring occasions within a multi-slot group. According to the second embodiment, a UE is configured with multi-slot PDCCH monitoring and a search space configuration is enhanced to include an indication for determining one slot within the multi-slot group where monitoring occasions are located (e.g., monitoringSlotWithinGroup). The indication of slots with monitoring occasion is received by a bitmap in a search space configuration. The indicated bitmap is used to determine which slot within the slot group has monitoring occasion, as illustrated in Table 1.

TABLE 1

Example illustration of bitmap to indicate slot with monitoring occasions within multi-slot

| Bitmap | Slot index within a group with monitoring occasions |
|---|---|
| 000 | 0 |
| 001 | 1 |
| 010 | 2 |
| 011 | 3 |
| 100 | 4 |
| 101 | 5 |
| 110 | 6 |
| 111 | 7 |

In such embodiments, a number of bits may be variable depending upon a number of slots for multi-slot PDCCH monitoring. In one implementation, the size of the monitoringSlotsWithinGroup may be fixed depending upon the subcarrier spacing that is configured at the UE. For example, with 480 kHz SCS the bitmap size is 2 bits for 4 slots, while for 960 kHz SCS the bitmap size is 3 bits for 8 slots.

In another implementation, when the UE is configured with monitoringSlotWithinGroup, then it is not required that the UE be configured with monitoringSymbolsWithinSlot. In this implementation, the UE is expected to monitor the entire slot for which the monitoring occasion is indicated.

In a further implementation, the UE is configured both with monitoringSlotWithinGroup and monitoringSymbolsWithinSlot. In this implementation, the monitoring slot within the multi-slot is indicated based on mapping illustrated in Table 1 and the exact symbols within the indicated slot for monitoring occasion are indicated by setting the corresponding bit value to '1' in monitoringSymbolsWithinSlot.

In certain implementations, the UE is configured both with monitoringSlotsWithinGroup and monitoringDurationWithinSlot. In these implementations, the monitoring slot within the multi-slot is indicated based on the mapping illustrated in Table 1. In that monitoring slot, the monitoring starts at the first symbol of the slot and lasts for a number of symbols indicated by monitoringDurationWithinSlot. In one implementation, an offset in symbols for PDCCH monitoring may be indicated by monitoringStartSymbol to start the monitoring at the indicated symbol number instead of at the beginning of a slot.

In a third embodiment, there may be a symbols indication for determining monitoring occasions within a multi-slot group. According to the third embodiment, a UE is configured with multi-slot PDCCH monitoring and a search space configuration is enhanced to include an indication for determining a group of symbols within the multi-slot group where monitoring occasions are located. The indication of slots with monitoring occasion is received by a bitmap in the search space configuration, where each bit is used to indicate monitoring occasion for a symbol group. The number of symbols within a group may be either explicitly configured or may be determined based on the number of slots within the slot group.

Figure 7:
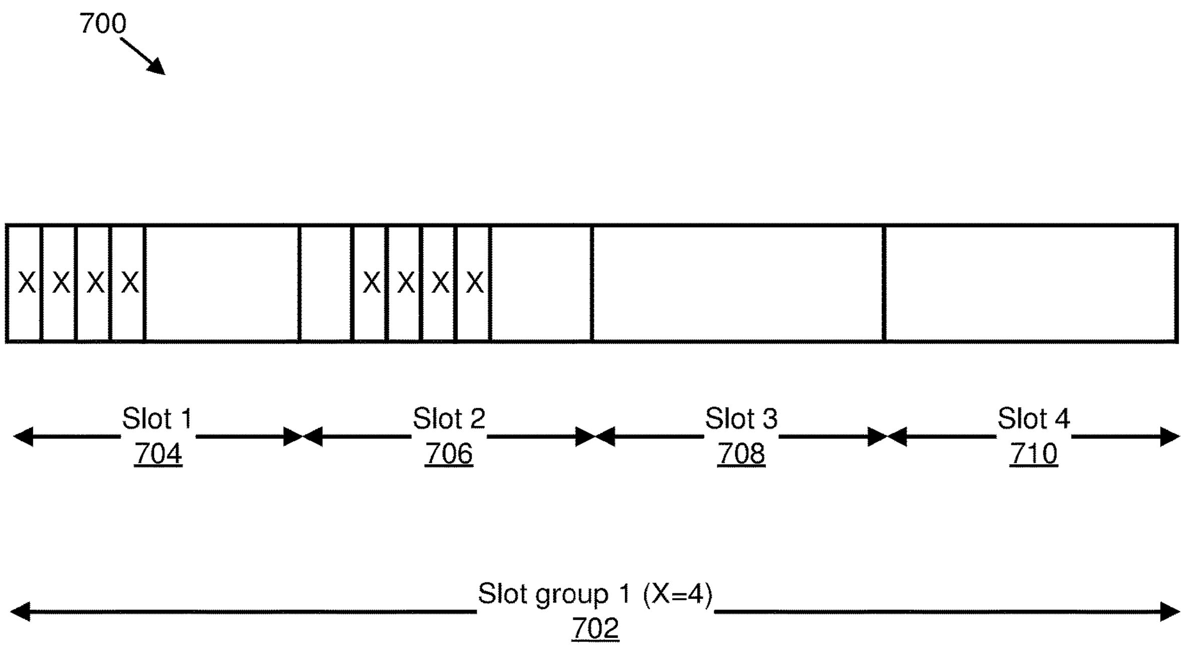
FIG. 7 is a timing diagram illustrating one embodiment of a system in which there is a monitoring slot indication for a multi-slot PDCCH monitoring with symbol grouping based mapping.

In one implementation, if a slot group includes 4 slots, then a 14 bit long bitmap is used to indicate monitoring occasion for a group of symbols, where each bit indicates 4 continuous symbols. An illustration is shown in FIG. 7, where the bitmap is "10001000000000". Based on this bitmap, each bit represents 4 symbols, so that this bitmap indicates symbols 0-3 (e.g., the first 4 symbols) and symbols 16-19. Assuming that each slot consists of 14 symbols, effectively the first 4 symbols of the first slot within the slot group are indicated and symbols 3-6 of the second slot for monitoring occasion (symbol 3 being the fourth symbols of the slot). In another implementation, a bitmap of 7 bits long is used to indicate monitoring occasion for a group of symbols in a monitoring slot for a slot group having 4 slots, where each bit indicates 8 contiguous symbols, e.g., a bitmap of 1010100 indicates monitoring occasions of 8 symbols in each of the first 3 contiguous slots (assuming a slot has 14 symbols).

FIG. 7 is a timing diagram illustrating one embodiment of a system 700 in which there is a monitoring slot indication for a multi-slot PDCCH monitoring with symbol grouping based mapping. The system 700 includes a slot group 1 702 (with a number of 4 slots per slot group). The slot group 1 702 includes a slot 1 704, a slot 2 706, a slot 3 708, and a slot 4 710. The symbols in the slot 1 704 and the slot 2 706 marked with an "X" are the monitoring occasions based on the bitmap is "10001000000000".

In another implementation, if a slot group includes 8 slots, then a 14 bit long bitmap is used to indicate monitoring occasion for a group of symbols, where each bit indicates 8 continuous symbols.

In some embodiments, a PDCCH monitoring occasion is not allowed to cross a slot boundary when a bit indicates a group of symbols crossing a slot boundary. In one implementation, only the last symbols of the first slot between two slots is considered for PDCCH monitoring when the group of symbols are crossing two slots. In another implementation, only the first symbols of a second slot between two slots is considered for PDCCH monitoring when the group of symbols are crossing two slots.

In various embodiments, monitoringSymbolsWithinSlot having one or more bits is used to indicate by one bit multiple symbols for PDCCH monitoring occasions, when multi-slot PDCCH monitoring is configured. In certain embodiments, a parameter in a search space configuration may be used to indicate multiple symbols for PDCCH monitoring occasions using 1 bit when multi-slot PDCCH monitoring is configured.

In some embodiments, each control resource set ("CORESET") and/or search space may be configured separately with monitoring occasion(s). In other words, not all CORESETs and/or search spaces within the slot and/or the slot group where monitoringSlotsWithinGroup is set to '1' needs to be monitored and those monitoring occasions can be configured separately.

In various embodiments, wake up signaling using DCI_format 2_6 indicates a monitoringSlotsWithinGroup for a next discontinuous reception ("DRX") on-period.

Figure 8:
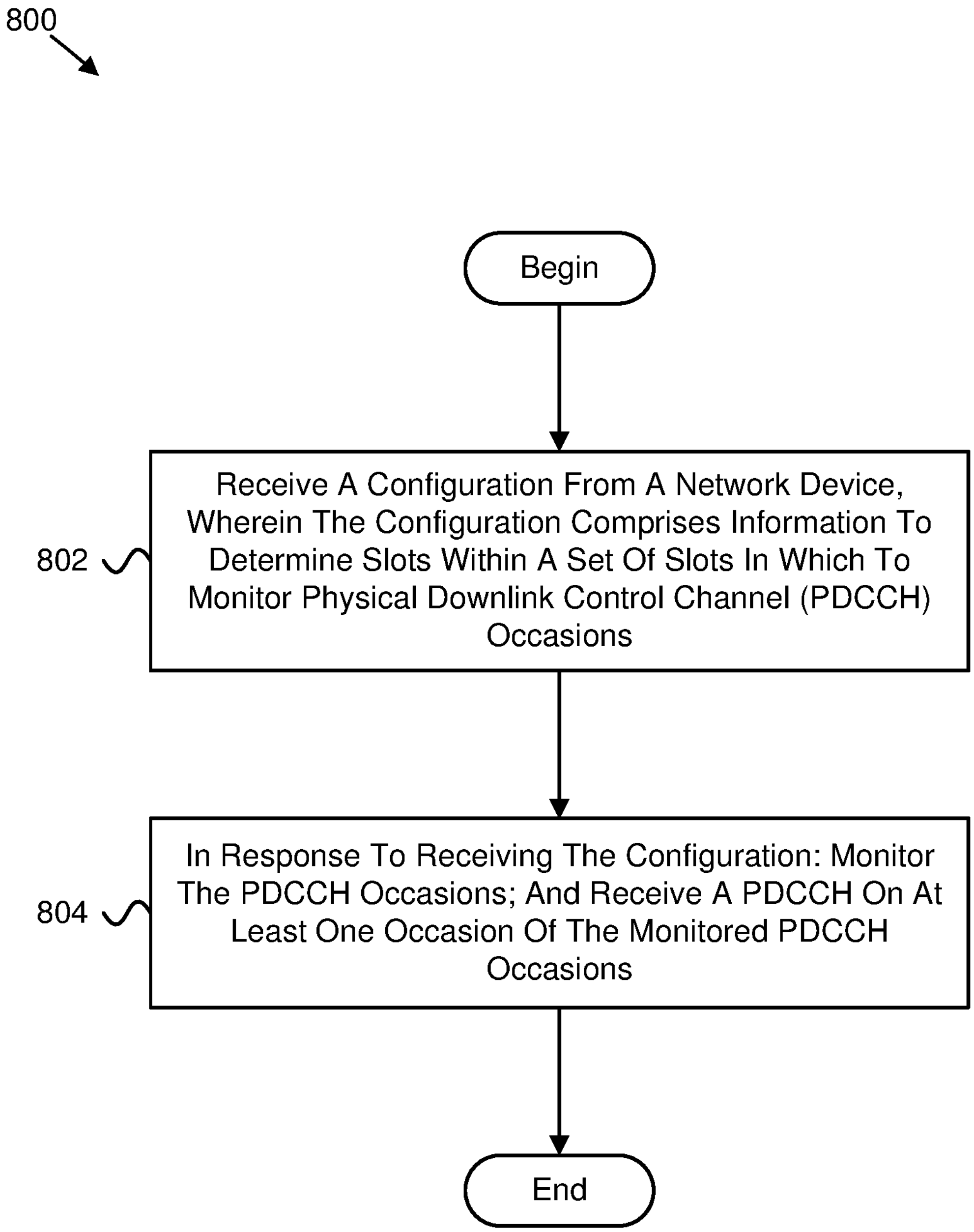
FIG. 8 is a flow chart diagram illustrating one embodiment of a method for configuring physical downlink control channel occasions for monitoring.

FIG. 8 is a flow chart diagram illustrating one embodiment of a method 800 for configuring physical downlink control channel occasions for monitoring. In some embodiments, the method 800 is performed by an apparatus, such as the remote unit 102. In certain embodiments, the method 800 may be performed by a processor executing program code, for example, a microcontroller, a microprocessor, a CPU, a GPU, an auxiliary processing unit, a FPGA, or the like.

In various embodiments, the method 800 includes receiving 802, at a remote device, a configuration from a network device. The configuration includes information to determine slots within a set of slots in which to monitor physical downlink control channel (PDCCH) occasions. In some embodiments, the method 800 includes, in response to receiving the configuration: monitoring 804 the PDCCH occasions; and receiving a PDCCH on at least one occasion of the monitored PDCCH occasions.

In certain embodiments, the configuration comprises a search space radio resource control (RRC) configuration. In some embodiments, the method 800 further comprises receiving first information indicating the slots within the set of slots, wherein the first information comprises a first bitmap with a length equal to a number of slots within the set of slots. In various embodiments, the first bitmap indicates a presence of the PDCCH occasions for a slot of the set of slots by setting a bit value to '1'.

In one embodiment, the method 800 further comprises receiving second information comprising a second bitmap that indicates symbols within the slot in which the PDCCH occasions are present. In certain embodiments, a second bitmap is applied for slots of the set of slots for which correspond bit values in the first bitmap are '1'. In some embodiments, the method 800 further comprises configuring a PDCCH monitoring periodicity, wherein the PDCCH monitoring periodicity is in multiples of a number of slots within the set of slots.

In various embodiments, the set of slots comprises a subcarrier spacing (SCS) value of 480 kHz or 960 kHz. In one embodiment, the method 800 further comprises configuring a PDCCH monitoring duration within a period, wherein the PDCCH monitoring duration is in multiples of a number of slots within the set of slots and less than or equal to a period length.

Figure 9:
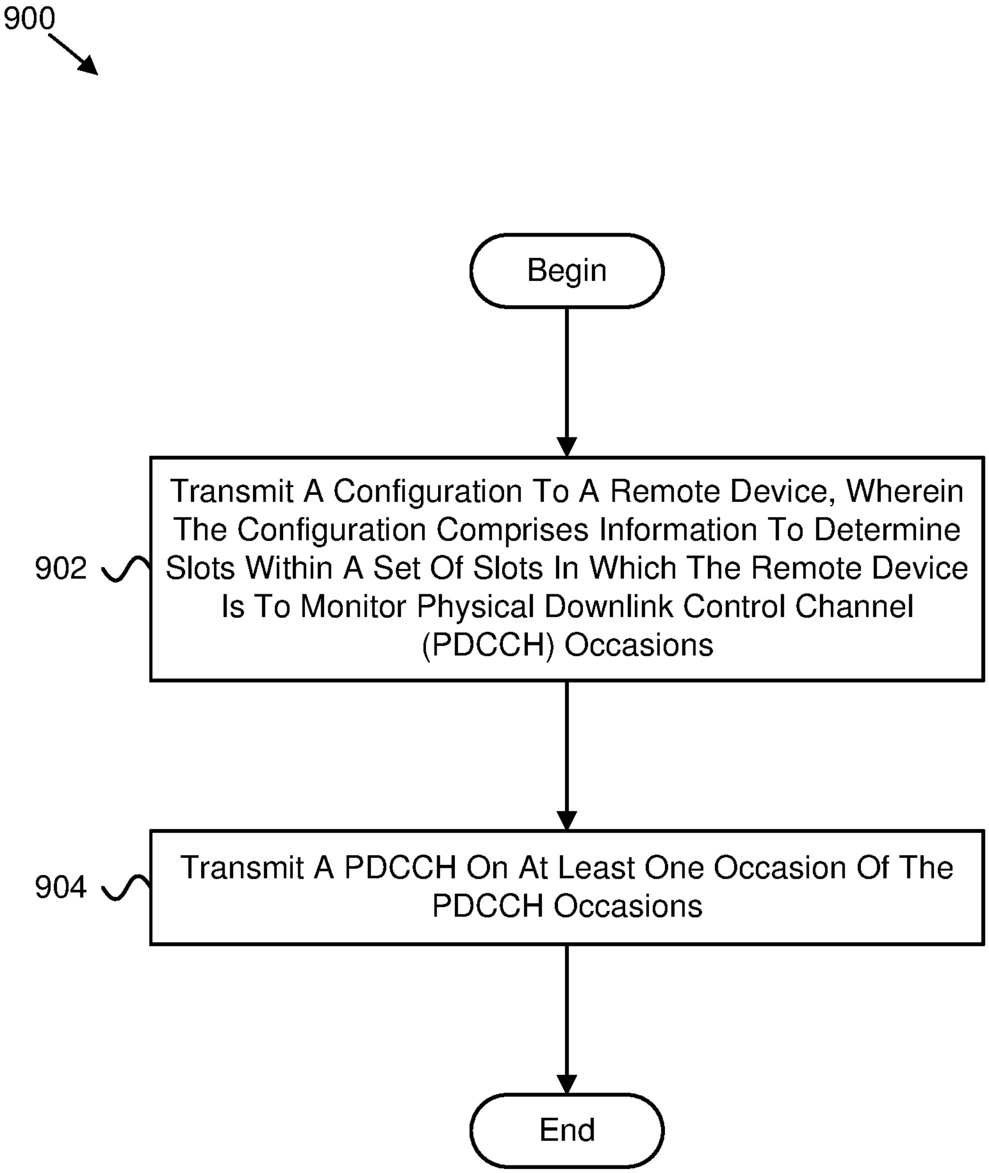
FIG. 9 is a flow chart diagram illustrating another embodiment of a method for configuring physical downlink control channel occasions for monitoring.

FIG. 9 is a flow chart diagram illustrating another embodiment of a method 900 for configuring physical downlink control channel occasions for monitoring. In some embodiments, the method 900 is performed by an apparatus, such as the network unit 104. In certain embodiments, the method 900 may be performed by a processor executing program code, for example, a microcontroller, a microprocessor, a CPU, a GPU, an auxiliary processing unit, a FPGA, or the like.

In various embodiments, the method 900 includes transmitting 902, from a network device, a configuration to a remote device. The configuration includes information to determine slots within a set of slots in which the remote device is to monitor physical downlink control channel (PDCCH) occasions. In some embodiments, the method 900 includes transmitting 904 a PDCCH on at least one occasion of the PDCCH occasions.

In certain embodiments, the configuration comprises a search space radio resource control (RRC) configuration. In some embodiments, the method 900 further comprises transmitting first information indicating the slots within the set of slots, wherein the first information comprises a first bitmap with a length equal to a number of slots within the set of slots. In various embodiments, the first bitmap indicates a presence of the PDCCH occasions for a slot of the set of slots by setting a bit value to '1'.

In one embodiment, the method 900 further comprises transmitting second information comprising a second bitmap that indicates symbols within the slot in which the PDCCH occasions are present. In certain embodiments, a second bitmap is applied for slots of the set of slots for which correspond bit values in the first bitmap are '1'.

In one embodiment, an apparatus comprises: a processor; and a receiver that receives, at a remote device, a configuration from a network device, wherein the configuration comprises information to determine slots within a set of slots in which to monitor physical downlink control channel (PDCCH) occasions, wherein: in response to receiving the configuration: the processor monitors the PDCCH occasions; and, in some embodiments, the receiver receives a PDCCH on at least one occasion of the monitored PDCCH occasions.

In certain embodiments, the configuration comprises a search space radio resource control (RRC) configuration.

In some embodiments, the receiver receives first information indicating the slots within the set of slots, and the first information comprises a first bitmap with a length equal to a number of slots within the set of slots.

In various embodiments, the first bitmap indicates a presence of the PDCCH occasions for a slot of the set of slots by setting a bit value to '1'.

In one embodiment, the receiver receives second information comprising a second bitmap that indicates symbols within the slot in which the PDCCH occasions are present.

In certain embodiments, a second bitmap is applied for slots of the set of slots for which correspond bit values in the first bitmap are '1'.

In some embodiments, the processor configures a PDCCH monitoring periodicity, and the PDCCH monitoring periodicity is in multiples of a number of slots within the set of slots.

In various embodiments, the set of slots comprises a subcarrier spacing (SCS) value of 480 kHz or 960 kHz.

In one embodiment, the processor configures a PDCCH monitoring duration within a period, and the PDCCH monitoring duration is in multiples of a number of slots within the set of slots and less than or equal to a period length.

In one embodiment, a method at a remote device comprises: receiving a configuration from a network device, wherein the configuration comprises information to determine slots within a set of slots in which to monitor physical downlink control channel (PDCCH) occasions; and in response to receiving the configuration: monitoring the PDCCH occasions; and, in some embodiments, receiving a PDCCH on at least one occasion of the monitored PDCCH occasions.

In certain embodiments, the configuration comprises a search space radio resource control (RRC) configuration.

In some embodiments, the method further comprises receiving first information indicating the slots within the set of slots, wherein the first information comprises a first bitmap with a length equal to a number of slots within the set of slots.

In various embodiments, the first bitmap indicates a presence of the PDCCH occasions for a slot of the set of slots by setting a bit value to '1'.

In one embodiment, the method further comprises receiving second information comprising a second bitmap that indicates symbols within the slot in which the PDCCH occasions are present.

In certain embodiments, a second bitmap is applied for slots of the set of slots for which correspond bit values in the first bitmap are '1'.

In some embodiments, the method further comprises configuring a PDCCH monitoring periodicity, wherein the PDCCH monitoring periodicity is in multiples of a number of slots within the set of slots.

In various embodiments, the set of slots comprises a subcarrier spacing (SCS) value of 480 kHz or 960 kHz.

In one embodiment, the method further comprises configuring a PDCCH monitoring duration within a period, wherein the PDCCH monitoring duration is in multiples of a number of slots within the set of slots and less than or equal to a period length.

In one embodiment, an apparatus comprises: a transmitter that: transmits, from a network device, a configuration to a remote device, wherein the configuration comprises information to determine slots within a set of slots in which the remote device is to monitor physical downlink control channel (PDCCH) occasions; and, in some embodiments, transmits a PDCCH on at least one occasion of the PDCCH occasions.

In certain embodiments, the configuration comprises a search space radio resource control (RRC) configuration.

In some embodiments, the transmitter transmits first information indicating the slots within the set of slots, wherein the first information comprises a first bitmap with a length equal to a number of slots within the set of slots.

In various embodiments, the first bitmap indicates a presence of the PDCCH occasions for a slot of the set of slots by setting a bit value to '1'.

In one embodiment, the transmitter transmits second information comprising a second bitmap that indicates symbols within the slot in which the PDCCH occasions are present.

In certain embodiments, a second bitmap is applied for slots of the set of slots for which correspond bit values in the first bitmap are '1'.

In one embodiment, a method at a network device comprises: transmitting a configuration to a remote device, wherein the configuration comprises information to determine slots within a set of slots in which the remote device is to monitor physical downlink control channel (PDCCH) occasions; and, in some embodiments, transmitting a PDCCH on at least one occasion of the PDCCH occasions.

In certain embodiments, the configuration comprises a search space radio resource control (RRC) configuration.

In some embodiments, the method further comprises transmitting first information indicating the slots within the set of slots, wherein the first information comprises a first bitmap with a length equal to a number of slots within the set of slots.

In various embodiments, the first bitmap indicates a presence of the PDCCH occasions for a slot of the set of slots by setting a bit value to '1'.

In one embodiment, the method further comprises transmitting second information comprising a second bitmap that indicates symbols within the slot in which the PDCCH occasions are present.

In certain embodiments, a second bitmap is applied for slots of the set of slots for which correspond bit values in the first bitmap are '1'.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A user equipment (UE), comprising:
- at least one memory; and
- at least one processor coupled with the at least one memory and configured to cause the UE to:
  - receive a configuration comprising information to determine one or more slots of a group of slots for monitoring one or more physical downlink control channel (PDCCH) occasions;
  - monitor, based on a PDCCH monitoring periodicity, the one or more PDCCH occasions during the one or more slots, wherein the PDCCH monitoring periodicity corresponds to a multiple of a number of slots in the group of slots; and
  - receive a PDCCH during at least one monitored PDCCH occasion.

2. The UE of claim 1, wherein the configuration comprises a radio resource control (RRC) configuration.

3. The UE of claim 1, wherein the at least one processor is configured to cause the UE to receive a first indication of the one or more slots in the group of slots, and the first indication comprises a first bitmap with a size equal to a number of slots in the group of slots.

4. The UE of claim 3, wherein the first bitmap indicates a presence of the one or more PDCCH occasions for the one or more slots in the group of slots by setting a bit value to '1'.

5. The UE of claim 4, wherein the at least one processor is configured to cause the UE to receive a second indication comprising a second bitmap that indicates one or more symbols within the one or more slots in which the one or more PDCCH occasions are present.

6. The UE of claim 5, wherein the second bitmap is applied for the one or more slots in the group of slots corresponding to bit values in the first bitmap of '1'.

7. The UE of claim 1, wherein the number of slots in the group of slots corresponds to a subcarrier spacing (SCS) value of 480 kHz or 960 kHz.

8. The UE of claim 1, wherein the at least one processor is configured to cause the UE to configure a PDCCH monitoring duration, wherein the PDCCH monitoring duration corresponds to a factor of a number of slots in the group of slots and less than or equal to a threshold.

9. A method performed by a user equipment (UE), the method comprising:

receiving a configuration comprising information to determine one or more slots of a group of slots for monitoring one or more physical downlink control channel (PDCCH) occasions;

monitoring, based on a PDCCH monitoring periodicity, the one or more PDCCH occasions during the one or more slots, wherein the PDCCH monitoring periodicity corresponds to a multiple of a number of slots in the group of slots; and receiving a PDCCH during at least one monitored PDCCH occasion.

10. A base station, comprising:

at least one memory; and at least one processor coupled with the at least one memory and configured to cause the base station to:

transmit a configuration comprising information to determine one or more slots of a group of slots for monitoring one or more physical downlink control channel (PDCCH) occasions and a PDCCH monitoring periodicity, wherein the PDCCH monitoring periodicity corresponds to a multiple of a number of slots in the group of slots; and transmit a PDCCH on at least one monitored PDCCH occasion of the at least one monitored PDCCH occasion.

11. The base station of claim 10, wherein the configuration comprises a radio resource control (RRC) configuration.

12. The base station of claim 10, wherein the at least one processor is configured to cause the base station to transmit a first indication of the one or more slots in the group of slots, and the first indication comprises a first bitmap with a size equal to a number of slots in the group of slots.

13. The base station of claim 12, wherein the first bitmap indicates a presence of the one or more PDCCH occasions for the one or more slots in the group of slots by setting a bit value to ‘1’.

14. The base station of claim 13, wherein:

the at least one processor is configured to cause the base station to transmit a second indication comprising a second bitmap that indicates one or more symbols within the one or more slots in which the one or more PDCCH occasions are present;

the second bitmap is applied for the one or more slots in the group of slots corresponding to bit values in the first bitmap of ‘1’;

or a combination thereof.

15. A processor for wireless communication, comprising:

at least one controller coupled with at least one memory and configured to cause the processor to:

receive a configuration comprising information to determine one or more slots of a group of slots for monitoring one or more physical downlink control channel (PDCCH) occasions;

monitor, based on a PDCCH monitoring periodicity, the one or more PDCCH occasions during the one or more slots, wherein the PDCCH monitoring periodicity corresponds to a multiple of a number of slots in the group of slots; and receive a PDCCH during at least one monitored PDCCH occasion.

16. The processor of claim 15, wherein the configuration comprises a radio resource control (RRC) configuration.

17. The processor of claim 15, wherein the at least one controller is configured to cause the processor to receive a first indication of the one or more slots in the group of slots, and the first indication comprises a first bitmap with a size equal to a number of slots in the group of slots.

18. The processor of claim 17, wherein the first bitmap indicates a presence of the one or more PDCCH occasions for the one or more slots in the group of slots by setting a bit value to ‘1’.

19. The processor of claim 18, wherein the at least one controller is configured to cause the processor to receive a second indication comprising a second bitmap that indicates one or more symbols within the one or more slots in which the one or more PDCCH occasions are present.

* * * * *